L. R. McDONALD.
ELECTRIC MOTOR.
APPLICATION FILED JUNE 16, 1916.
1,396,334.
Patented Nov. 8, 1921.
2 SHEETS—SHEET 1.
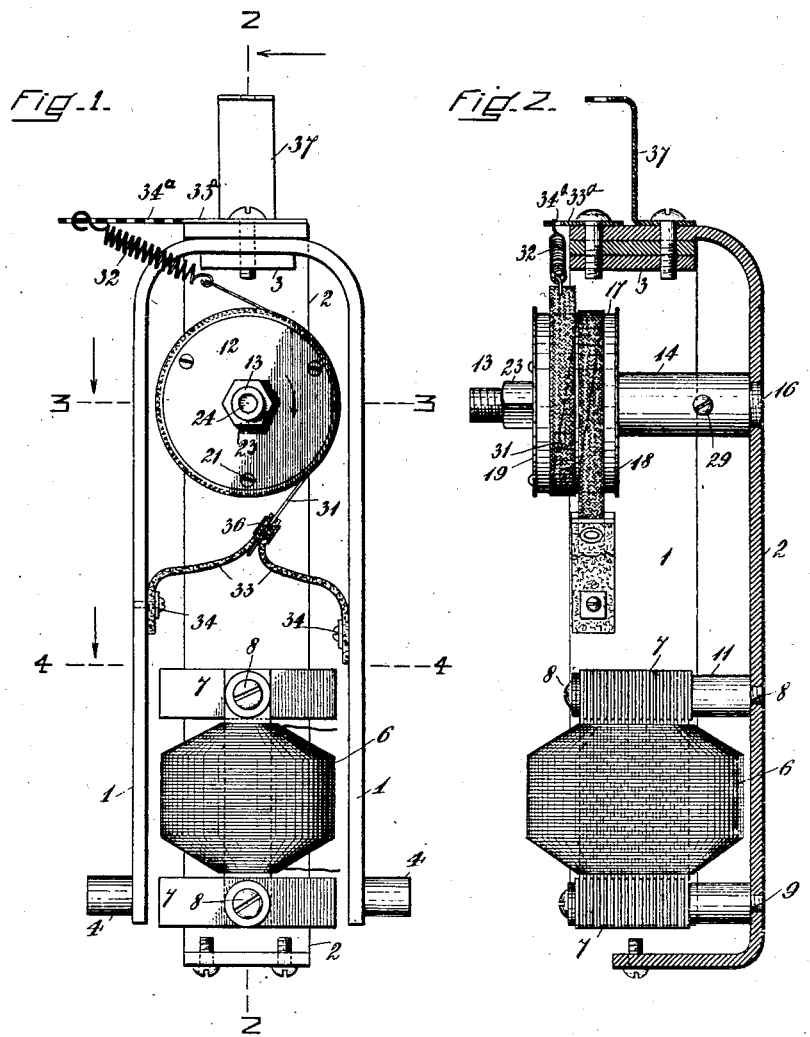
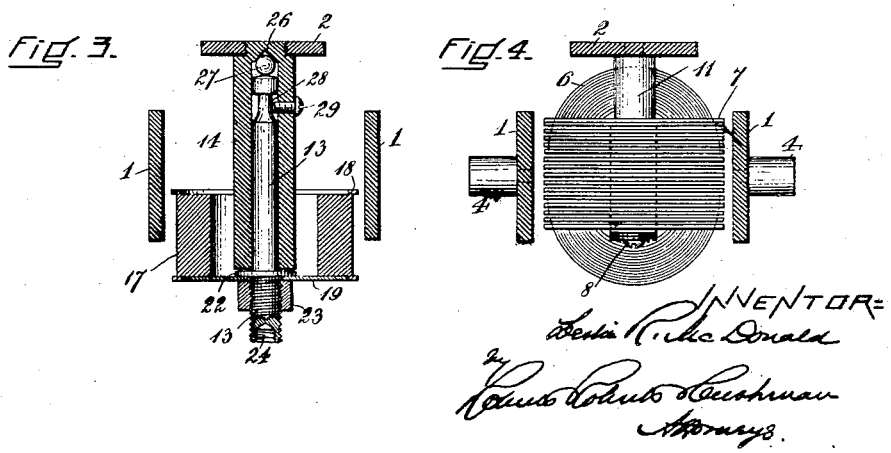

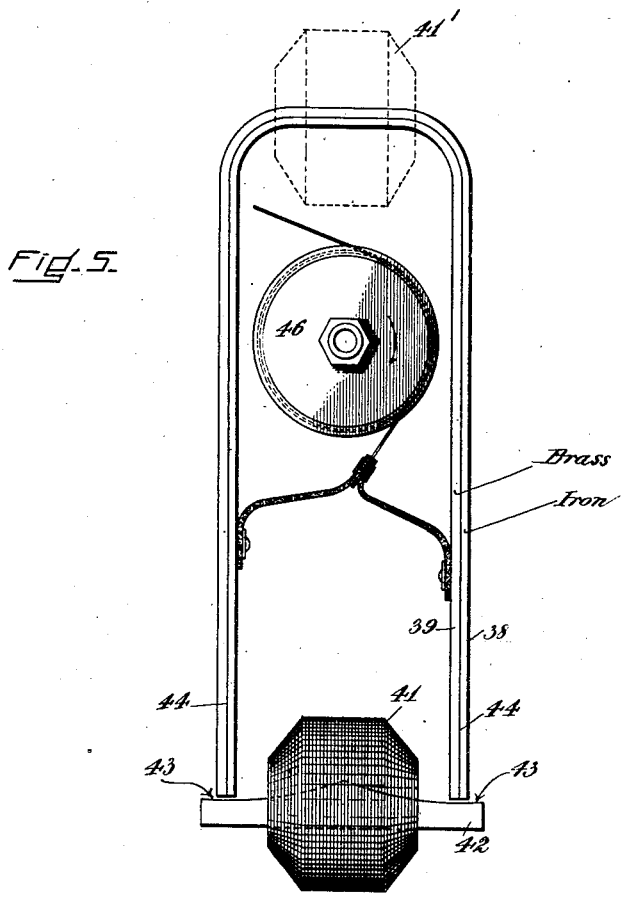

UNITED STATES PATENT OFFICE.

LESLIE R. McDONALD, OF MONTREAL, QUEBEC, CANADA, ASSIGNOR TO MARGUERITE V. O'LEARY, OF MONTREAL, CANADA.

ELECTRIC MOTOR.

1,396,334. Specification of Letters Patent. Patented Nov. 8, 1921.

Application filed June 16, 1916. Serial No. 104,095.

*To all whom it may concern:*

Be it known that I, LESLIE R. McDONALD, a citizen of the United States, and resident of Montreal, in the Province of Quebec and Dominion of Canada, have invented new and useful Improvements in Electric Motors, of which the following is a specification.

This invention relates to a method and apparatus for producing continuous rotation at a comparatively low velocity, and more particularly the invention relates to an electric motor comprising a rotary member, oscillatory means making frictional engagement with said member for continuously rotating the member, and means to produce a regularly varying magnetic field having a frequency of variation substantially equal to the natural frequency of oscillation of the oscillatory means for actuating the oscillatory means.

On object of the invention is to provide a simple and durable motor which is adapted to produce considerable torque at a relatively low angular velocity and which may be operated by means of vibratory current such as, for example, the ordinary commercial current alternating at sixty cycles per second. Such a motor is particularly useful for operating phonographs, advertising devices, display tables, and the like, where it is desirable to employ commercial alternating current to drive the apparatus at comparatively low speed. By my invention the usual transmission mechanism transforming high velocity rotation into low velocity rotation is eliminated and low velocity rotation may be produced directly and efficiently.

Other objects of the invention will be apparent from the following description and the accompanying drawings, in which,—

Figure 1 is a plan view of one embodiment of my invention;

Fig. 2 is a longitudinal section taken on the line 2—2 of Fig. 1;

Fig. 3 is a transverse section taken on the line 3—3 of Fig. 1, parts being omitted;

Fig. 4 is a transverse section taken on the line 4—4 of Fig. 1, parts being omitted; and Fig. 5 is a plan view of a modified form of my invention, parts being omitted.

The construction disclosed in the modified form shown in Fig. 5 is not claimed in the present application but is claimed in my co-pending application Serial No. 139,448, filed December 29, 1916.

The particular embodiment of my invention disclosed in Figs. 1 to 4 comprises vibratory members 1 arranged in the form of a tuning fork and mounted on one end of the U-shaped supporting member 2 by means of machine screws threaded into the plate member 3. Weights 4 are preferably mounted at on near the ends of the vibratory members to give the vibratory members the desired natural period of vibration, and these weights may obviously be made adjustable if desired, either with respect to their weight or with respect to their longitudinal position on the vibratory members in order to adjust the period of vibration of the device.

An electro-magnet comprising a field coil 6 and laminated pole pieces 7 is mounted near the opposite end of the U-shaped support 2 with the faces of the pole pieces disposed in planes parallel with but slightly displaced from the vibratory members. The means for supporting the electro-magnet comprises machine screews 8 which pass through the pole pieces and are threaded into the openings 9 in the U-shaped supporting member, two tubular spacing members 11 being disposed around the machine screws between the pole pieces and the U-shaped support to position the electro-magnet with relation to the vibratory members.

The rotary portion of the motor comprises a pulley 12 mounted on a shaft 13 which rotates in the bearing 14, threaded into the opening 16 of the U-shaped supporting member. The pulley is preferably made in the form of a cylinder 17 of considerable thickness in order to afford sufficient weight for the pulley also to function as a fly-wheel. Around the outer, upper edge of the pulley (Fig. 3) is provided a raised portion 18 and on the lower side of the pulley is secured a disk 19 having an aperture in the center thereof to receive the shaft 13 and extending slightly beyond the outer periphery of the pulley. The disk 19 is secured to the pulley by means of machine screws 21 passing through openings in the disk and being threaded into the pulley, the flange 18 and the peripheral edge of the disk 19 extending beyond the pulley serve as guides for the pulley belt. The shaft 13 is provided with a flange 22, and has the portion thereof extending below the flange threaded to receive a nut 23 for clamping the disk 19 between the flange and the nut. The lower end of the shaft is internally threaded at 24 to provide means for connecting the rotary portion of the motor with the device to be driven thereby. The upper end of the bearing 14 is recessed at 26 to receive the ball bearing 27 provided to support the shaft 13, it being understood that the motor is designed to be operated in the reverse position from that shown in Fig. 3. The shaft 13 is provided with a groove 28 coöperating with a machine screw 29 threaded through the bearing 14 to prevent the shaft from being accidentally withdrawn from the bearing.

The means by which the vibratory members 1 produce rotation of the rotary means 12 comprises a belt 31 contacting with a portion of the periphery of the pulley, and being secured at one end to the vibratory members and at the other end to the spring 32. The means for connecting the belt to the vibratory members preferably comprises two straps 33, which are respectively secured to the vibratory members in any suitable manner, as for example by the machine screws 34, and which are secured to each other and to the belt by a suitable means, as for example the rivet 36. The spring 32 is supported on the U-shaped member 2 by means of a plate 33ª having a series of openings 34ª therein to receive one end of the coil spring, the series of openings being provided to permit adjustment of the tension of the spring. The belt 31 is preferably made of impregnated fibrous material, and is preferably arranged to contact with the pulley through an angle of approximately 360° in order to afford considerable frictional bearing surface between the bearing and the pulley. The device may be attached to a support in any suitable manner as for example by means of brackets secured to the ends of the U-shaped member, one of which is shown at 37.

In the modified form of my invention shown in Fig. 5, the vibratory members comprise two straps of metal brazed or otherwise secured together, preferably only at their ends, the outside strap 38 being formed of magnetic material and the inside strap 39 being formed of non-magnetic material, suitable materials comprising iron and brass respectively. The electromagnet for actuating the vibratory members preferably comprises a field coil 41 surrounding an armature 42 having arcuate faces 43, each of which has a radius of curvature substantially equal to the length of each of the vibratory members and whose center of curvature is substantially at the fixed end of the corresponding vibratory member, so that the length of the air-gaps between the vibratory members 44 and the armature 42 remain substantially constant as the vibratory members move to and fro along the arcuate faces 43. As shown by dotted lines 41′ at the upper part of Fig. 5, the energizing coil may be positioned around the end of the tuning fork instead of around the armature thereof. The connection between the vibratory members 44 and the rotary member 46 may be the same in Fig. 5 as above described in connection with Figs. 1 to 4.

When an alternating or pulsating current is caused to flow through the coil 41 or the coil 41′; a pulsatory flux is caused to flow through the outer, magnetic portion of the vibratory members across the air-gaps and through the armature 42. Owing to the effect of the magnetic flux on the magnetic portion 38 of the vibratory members produced by the pulsations of magnetic flux, the vibratory members are caused to vibrate to and fro in synchronism with the variations of current and flux, the vibratory members preferably having a natural period of vibration substantially equal to the period of variation of the flux and current as in Figs. 1 to 4. This action I believe to be due to the fact that the lines of force through the magnetic portion of the vibratory members causes the molecules of metal to arrange themselves longitudinally, thus causing an elongation of the magnetic portion of the vibratory members, and owing to the fact that comparatively little flux passes through the non-magnetic portion of the vibratory members, this portion is little, if any, affected by the variations in flux. Thus as the flux increases in intensity throughout the magnetic portion of the vibratory members, the said portions increase in length, and being on the outside of the fork the members are caused to move together. As the flux decreases the resiliency of the vibratory members causes them to move apart, and as the flux increases again, either in the same or in the opposite direction, the members are again caused to move inwardly, this action continuing in synchronism with the variations of magnetic flux.

Moreover, the vibration of the tuning fork arms in the construction shown in Fig. 5 may be due in part to the well-known electrical phenomenon resulting from the tendency of a magnetic field to contract and to take the shortest magnetic path available. Thus in Fig. 5, the contracting tendency of the magnetic flux through the armature 45 and tuning fork 44 would tend to pull the free ends of the tuning fork arms inwardly, thereby to reduce the length of the magnetic path. This action is of course more or less independent of the double formation of the tuning fork shown in Fig. 5, and would take place if the fork were made wholly of iron or other magnetic material.

The operation of my novel apparatus and the mode of performing my new method will be rendered more apparent by reference to a well-known phenomenon of wave motion manifested for example, in the so-called Melde's experiment (*Watson's Physics*, 4th ed., p. 389). In this experiment a flexible string is disposed horizontally in alinement with the path of vibration of a vertically disposed tuning fork with one end attached to the tuning fork and the other end extending over a pulley to a weighted pan. When the tuning fork vibrates, that portion of the string between the tuning fork and the pulley vibrates in synchronism with the fork in the plane of the vibration of the fork, namely, up and down. As the fork moves away from the pulley the first time (or the first few times) the string is pulled upwardly over the pulley somewhat, the amount depending largely upon the weight in the pan, but after the vibration has begun the weighted pan does not move appreciably, only the portion of the string between the fork and the pulley vibrating up and down. When the fork is farthest away from the pulley the vibrating portion of the string is horizontal. As the fork moves toward the pulley the string moves down, reaching its lowermost position when the fork is nearest the pulley. As the fork moves away from the pulley the string moves up, reaching the horizontal position when the fork is farthest from the pulley. As the fork moves toward the pulley again the string does not again move down but owing to its inertia it is carried above the horizontal, reaching its uppermost position when the fork is nearest the pulley. Thus the string completes only one cycle during two complete cycles of vibration of the fork.

The maximum movement in the longitudinal direction of the string is at the end connected to the tuning fork and under proper conditions there will be substantially no movement of the string at the pulley end, the weighted pan merely serving as tensioning means. Indeed, the experiment can be carried out if the end of the string remote from the fork is fixedly secured to a stationary support.

The phenomenon described in the preceding paragraph takes place when the string is so related to the fork that the entire portion of the string between the pulley and the fork vibrates as a unit, that is, when the string has the proper weight, length, tension and stiffness to vibrate in synchronism with the tuning fork. However, if the tension of the string be increased a certain amount, that portion of the string between the fork and the pulley will vibrate not as a whole but in sections, the sections being defined by nodes and antinodes. As the tension on the string increases the wave intervals increase and the horizontal movement of the end of the string connected to the tuning fork decreases. When the tuning fork is moving toward the pulley the string is moving under gradually decreasing tension whereas when the tuning fork is moving away from the pulley the tension is gradually increasing, so that if a member be brought into frictional engagement with the end of the string adjacent the tuning fork there would be a tendency to move the member toward the tuning fork since the pulling force acts in this direction.

According to the present invention the tensioned belt is so associated with the tuning fork that vibration of the tuning fork moves one end of the belt to and fro along the length of the belt. This produces waves in the belt in the above described manner and these waves operate throughout the portion of the belt contacting with the pulley to rotate the pulley toward the tuning fork as above explained. The major portion of the rotative tendency is imparted to the pulley by that portion of the belt nearer to the vibrating member inasmuch as that portion is moved a greater amount than the portion adjacent the fixed end of the belt. In some respects the force is applied to the rotatable member by the belt in the same way that a snake creeping over the surface of the ground applies a force to the ground longitudinal of its path of movement. By increasing the tension of the belt the length of the belt waves decreases and the belt is brought more intimately into contact with the rotatable member so that while under increased tension on the string the revolutions per minute decrease but the power transmitted increases.

I claim:

1. Apparatus of the character described comprising a rotor, a belt contacting with the periphery of the rotor, and means for imparting a wave motion to the belt so as unidirectionally to rotate the rotor.

2. Apparatus of the character described comprising a rotor, a belt contacting with the periphery of the rotor, means for tensioning the belt, and means for imparting a wave motion to the belt so as unidirectionally to rotate the rotor.

3. Apparatus of the character described comprising a rotor, a tensioned belt contacting with the periphery of the rotor, and means for varying the tension on the belt so as to impart to the belt a wave motion adapted to rotate the rotor unidirectionally.

4. Apparatus of the character described comprising a rotor, a belt having a portion thereof contacting with the periphery of the rotor, means associated with a portion of the belt on one side of said first portion for tensioning the belt, and means associated with a portion of the belt on the other side of said first portion for imparting to the belt a wave motion adapted to rotate the rotor unidirectionally.

5. Apparatus of the character described comprising a rotor, a belt contacting with the periphery of the rotor, and means for rapidly oscillating a portion of the belt to and fro in such manner as to impart to the belt a wave motion adapted to rotate the rotor unidirectionally.

6. Apparatus of the character described comprising a rotor, a belt contacting with the periphery of the rotor, and means for rapidly oscillating a portion of the belt to and fro in the direction of its length so as to impart to the belt a wave motion adapted to rotate the rotor unidirectionally.

7. Apparatus of the character described comprising two vibratory members, means for vibrating the members toward and from each other in synchronism, a rotor, and a belt contacting with the periphery of the rotor and connecting with said members so as to rotate the rotor unidirectionally when said members are vibrated.

8. Apparatus of the character described comprising two vibratory members, means for vibrating the members toward and from each other in synchronism, a rotor, a belt contacting with the periphery of the rotor, means holding the belt substantially stationary at one end, and means connecting the belt to said members at the other end, the parts being arranged to rotate the rotor unidirectionally when said members are vibrated to and fro.

9. Apparatus of the character described comprising a tuning fork, a rotor mounted between the prongs of the fork to rotate about an axis transverse of the plane of vibration of the fork, a tensioned belt contracting with the periphery of the rotor and connected at one end with each prong of said fork so as unidirectionally to rotate the rotor when the tuning fork is vibrated.

10. An electric motor comprising vibrating members arranged in the form of a tuning fork, means positioned between the free ends of said vibratory members to produce a variable magnetic field for vibrating said vibratory members to and from each other in synchronism, a rotary member mounted between said vibratory members, and means attached to both of said vibratory members intermediate their free and fixed ends, respectively, for producing continuous rotation of said rotary member by waves set up in said means by the vibratory members.

11. In a device comprising a rotor and a belt contacting with the periphery of the rotor, the method of actuating the rotor comprising inducing in the belt a wave motion adapted to rotate the rotor unidirectionally.

12. In a device comprising a rotor and a belt contacting with the periphery of the rotor, the method of rotating the rotor comprising producing a wave motion in the belt by rapidly oscillating one end of the belt to and fro.

13. In a device comprising a rotor and a belt contacting with the periphery of the rotor, the method of rotating the rotor comprising producing a wave motion in the belt by rapidly oscillating one end of the belt to and fro in the direction of its length.

14. In a device comprising a rotor and a belt contacting with the periphery of the rotor, the method of actuating the rotor comprising holding the belt substantially stationary on one side of the rotor and imparting to the belt on the other side of the rotor a wave motion adapted unidirectionally to rotate the rotor.

15. The method of producing rotary motion, which consists in establishing frictional engagement between a flexible member and the device to be rotated; then producing longitudinal vibrations in said member by alternately increasing and decreasing the tension on said member by forces applied at one end of said member and in the direction of its length.

16. The method of producing rotary motion, from induced wave motions, which consists in establishing frictional contact between the device to be rotated and a flexible member; then utilizing the induced wave motion to vibrate the flexible member by rapidly increasing and decreasing tension on said member by forces applied at one end of said member and in the direction of its length.

17. The method of producing rotary motion from vibratory forces, which consists in passing a substantially non-stretchable flexible band around the device to be rotated; then rapidly varying the tension on one end of said band to set up waves in said band whereby the wave motion in said band causes the said device to rotate.

18. The method of utilizing power derived from an alternating electric current, which method comprises providing a vibratory member having a natural period of free vibration corresponding to the period of oscillation of the alternating current to be used; providing electromagnetic means which when energized by said current will maintain said member in vibration; then transforming each vibration of said member into a unidirectional force; then applying said force to a revoluble member whereby said revoluble member is rotated continuously in a single direction.

19. A motor comprising a rotary member, a flexible band around and in contact with said rotary member, and electromagnetic means adapted when energized by a suitable current to maintain lengthwise pulsations in said band whereby the pulsations in said band drive said rotary member in a single direction.

20. As an article of manufacture, an energizer for an electric motor, comprising in combination, vibratory means having a definite normal rate of vibration, electromagnetic devices adapted when energized by a suitable current to maintain said means in vibration, and a flexible member secured to said means in such manner as to receive pulsations in the direction of its length when the said means vibrates.

21. As an article of manufacture, an energizer for an electric motor comprising in combination, vibratory means, electromagnetic devices adapted when energized by a suitable current to maintain said means in vibration, and a flexible member secured to said means in such manner as to receive pulsations in the direction of its length, a rotating member, said means being adapted when brought into frictional engagement with the rotating member to transform said pulsations into unidirectional motion.

22. The method of producing rotary motion from an alternating electric current, which method consists in establishing frictional engagement between a flexible member and the device to be rotated; then causing said alternating current to alternately increase and decrease the tension on said member in synchronism with the oscillations of said current and by forces applied at one end of said member in the direction of its length.

23. The method of utilizing power derived from an alternating current, which method comprises providing a vibratory member having a natural period of free vibrations corresponding to the period of oscillation of the alternating current to be used; providing electromagnetic means which when energized by said current will maintain said member in vibration; establishing frictional engagement between the flexible member and the device to be rotated by means of a flexible member in such manner that the vibration of said vibratory member alternately increases and decreases the tension on the flexible member by forces applied at one end thereof and in the direction of its length.

24. A motor for utilizing power derived from an alternating electrical current, said motor comprising, in combination, a vibratory member having a natural period of free vibrations corresponding to the period of oscillation of the alternating current to be used, electromagnetic means adapted when energized by said current to maintain said member in vibration, a revoluble member, and means connecting said vibratory member with said revoluble member in such manner that the vibration of said vibratory member is applied as a unidirectional force to continuously rotate said revoluble member in a single direction.

25. A motor for utilizing power derived from an electrical current, said motor comprising, in combination, a vibratory member having a predetermined natural period of free vibrations, electromagnetic means adapted when energized by a suitable current to maintain said member in vibration, a revoluble member, and means connecting said revoluble member with said vibratory member in such manner that the vibration of said vibratory member is applied as a unidirectional force to continuously rotate said revoluble member in a single direction.

Signed by me at Montreal, Canada, this 10th day of June, 1916.

LESLIE R. McDONALD.